US010985559B2

(12) United States Patent
Anderson et al.

(10) Patent No.: US 10,985,559 B2
(45) Date of Patent: *Apr. 20, 2021

(54) METHOD AND SYSTEM FOR IMPROVED OPERATION OF POWER GRID COMPONENTS IN THE PRESENCE OF DIRECT CURRENT (DC)

(71) Applicant: TechHold, LLC, Minneapolis, MN (US)

(72) Inventors: George Anderson, Champlin, MN (US); Greg Fuchs, River Falls, WI (US); Wallace Jensen, Centerville, MN (US); Gale K. Nordling, Alexandria, MN (US); Terry Lee Volkmann, St. Michael, MN (US); Frederick R. Faxvog, Medina, MN (US); David Blake Jackson, Excelsior, MN (US)

(73) Assignee: TechHold LLC, Minneapolis, MN (US)

( * ) Notice: Subject to any disclaimer, the term of this patent is extended or adjusted under 35 U.S.C. 154(b) by 536 days.

This patent is subject to a terminal disclaimer.

(21) Appl. No.: 15/887,781

(22) Filed: Feb. 2, 2018

(65) Prior Publication Data

US 2018/0226796 A1    Aug. 9, 2018

Related U.S. Application Data

(60) Provisional application No. 62/454,440, filed on Feb. 3, 2017.

(51) Int. Cl.
*H02H 7/00* (2006.01)
*H02J 3/01* (2006.01)
(Continued)

(52) U.S. Cl.
CPC ............... *H02J 3/01* (2013.01); *H02H 3/05* (2013.01); *H02H 3/332* (2013.01); *H02H 7/04* (2013.01); *H02H 7/042* (2013.01); *H02H 7/222* (2013.01)

(58) Field of Classification Search
None
See application file for complete search history.

(56) References Cited

U.S. PATENT DOCUMENTS 3,619,723 A   11/1971  Walden
3,916,261 A   10/1975  Zylstra et al.
(Continued)

FOREIGN PATENT DOCUMENTS

EP   0 240 783 A1   10/1987
GB   2 347 225 A    8/2000
(Continued)

OTHER PUBLICATIONS

Bolduc, L. et al., "Development of a DC Current-Blocking Device for Transformer Neutrals," IEEE Transactions on Power Delivery, vol. 20, No. 1, pp. 163-168 (Jan. 2005).
(Continued)

*Primary Examiner* — Stephen W Jackson
(74) *Attorney, Agent, or Firm* — Merchant & Gould P.C.

(57) ABSTRACT

Methods and systems for ensuring operation of one or more circuit breakers electrically connected on a phase of a multi-phase power line on a transformer electrically connected within a power grid at a substation are disclosed. The method includes detecting, at the transformer, a direct current component of a multi-phase power signal received at the transformer, the direct current component comprising a direct current received at a transformer neutral, the transformer neutral being electrically connected to a ground. The method further includes determining whether the direct
(Continued)

current is above a predetermined threshold, the predetermined threshold being based on a determination that, above the predetermined threshold, at least one of the one or more circuit breakers is incapable of reliable operation. The method includes, in response to a determination that the direct current component is above the predetermined threshold, blocking the direct current between the transformer neutral and a ground.

17 Claims, 11 Drawing Sheets

(51) Int. Cl.
  *H02H 7/04* (2006.01)
  *H02H 3/05* (2006.01)
  *H02H 3/33* (2006.01)
  *H02H 7/22* (2006.01)

(56) References Cited

U.S. PATENT DOCUMENTS

| | | |
|---|---|---|
| 4,153,891 A | 5/1979 | McNutt |
| 4,297,738 A | 10/1981 | Lee |
| 4,507,703 A | 3/1985 | Blau et al. |
| 4,580,186 A | 4/1986 | Parker et al. |
| 4,654,806 A | 3/1987 | Poyser et al. |
| 5,136,453 A | 8/1992 | Oliver |
| 5,179,489 A | 1/1993 | Oliver |
| 5,220,480 A | 6/1993 | Kershaw, Jr. et al. |
| 5,390,064 A | 2/1995 | Russo |
| 5,684,466 A | 11/1997 | Keating et al. |
| 5,751,530 A | 5/1998 | Pelly et al. |
| 5,930,099 A | 7/1999 | Legro et al. |
| 5,982,276 A | 11/1999 | Stewart |
| 6,144,341 A | 11/2000 | Kraz |
| 6,188,552 B1 | 2/2001 | Jaeschke et al. |
| 6,229,682 B1 | 5/2001 | Mechanic |
| 6,560,086 B2 | 5/2003 | Mechanic |
| 7,321,291 B2 | 1/2008 | Gidge et al. |
| 7,529,069 B1 | 5/2009 | Weems, II et al. |
| 7,541,995 B1 | 6/2009 | Murphy, Jr. |
| 7,589,943 B2 | 9/2009 | Ramirez et al. |
| 7,598,857 B1 | 10/2009 | Reagan et al. |
| 7,945,213 B2 | 5/2011 | Sulkowski, Jr. et al. |
| 7,969,696 B2 | 6/2011 | Lazarovich et al. |
| 8,035,935 B2 | 10/2011 | Ramirez et al. |
| 8,537,508 B2 | 9/2013 | Faxvog et al. |
| 8,547,710 B2 | 10/2013 | Ruehl et al. |
| 8,642,900 B2 | 2/2014 | Nordling et al. |
| 8,760,859 B2 | 6/2014 | Fuchs et al. |
| 8,773,107 B2 | 7/2014 | Jackson et al. |
| 8,860,402 B2 | 10/2014 | Jackson et al. |
| 8,878,396 B2 | 11/2014 | Faxvog et al. |
| 9,077,172 B2 | 7/2015 | Faxvog et al. |
| 9,564,753 B2 * | 2/2017 | Faxvog ............ H02H 9/08 |
| 10,199,821 B2 | 2/2019 | Fuchs et al. |
| 2001/0040458 A1 | 11/2001 | MacBeth et al. |
| 2007/0217103 A1 | 9/2007 | Af Klercker Alakula et al. |
| 2008/0179945 A1 | 7/2008 | Linebach et al. |
| 2008/0232006 A1 | 9/2008 | Ramirez et al. |
| 2009/0147415 A1 | 6/2009 | Lazarovich et al. |
| 2010/0046129 A1 | 2/2010 | Mikrut |
| 2010/0097734 A1 | 4/2010 | Bimbach |
| 2010/0195256 A1 | 8/2010 | Bimbach |
| 2011/0089929 A1 | 4/2011 | Jackson et al. |
| 2011/0092181 A1 | 4/2011 | Jackson et al. |
| 2012/0019962 A1 | 1/2012 | Faxvog et al. |
| 2012/0019965 A1 | 1/2012 | Faxvog et al. |
| 2013/0285671 A1 | 10/2013 | Hoffman et al. |
| 2013/0308229 A1 | 11/2013 | Faxvog et al. |
| 2015/0311697 A1 | 10/2015 | Faxvog et al. |
| 2016/0197469 A1 | 7/2016 | Fuchs et al. |
| 2018/0145504 A1 | 5/2018 | Kovan et al. |
| 2018/0205217 A1 | 7/2018 | Fuchs et al. |
| 2019/0036326 A1 | 1/2019 | Anderson et al. |

FOREIGN PATENT DOCUMENTS

| | | |
|---|---|---|
| JP | 58-46804 A | 3/1983 |
| JP | 59-13313 A | 1/1984 |
| JP | 2-142358 A | 5/1990 |
| JP | 3-207224 A | 9/1991 |
| JP | 5-81973 A | 4/1993 |
| JP | 5-258837 A | 10/1993 |
| JP | 6-260308 A | 9/1994 |
| JP | 2001-28829 A | 1/2001 |
| JP | 2004-347563 A | 12/2004 |

OTHER PUBLICATIONS

DC Blocking Device, Siemens AG, 13 pages (Sep. 20, 2013).
International Search Report and Written Opinion for PCT/US2011/044536 dated Mar. 27, 2012.
International Search Report and Written Opinion for PCT/US2011/044658 dated Jul. 12, 2012.
Invitation to Pay Additional Fees with Partial International Search cited in International Application No. PCT/US2011/044536 dated Nov. 21, 2011.
Japanese Office Action for Application No. 2013-520809 dated Mar. 24, 2015.
Edward Savage et al., Metatech (Meta-R-320) "The Early-Time (E1) High-Altitude Electromagnetic Pulse (HEMP) and Its Impact on the U.S. Power Grid", Metatech Corporation, Jan. 2010, 168 Pages.
International Search Report and Written Opinion for Application No. PCT/US2016/012358 dated Jun. 15, 2016.
James Gilbert et al., Metatech (Meta-R-321) "The Late-Time (E3) High-Altitude Electromagnetic Pulse (HEMP) and Its Impact on the U.S. Power Grid", Metatech Corporation, Jan. 2010, 155 Pages.
John Kappenman, Metatech (Meta-R-319) "Geomagnetic Storms and Their Impacts on the U.S. Power Grid", Metatech Corporation, Jan. 2010, 197 Pages.
Kappenman, et al., GIC Mitigation: A Neutral Blocking/Bypass Device to Prevent the Flow of GIC in Power Systems, IEEE Transactions on Power Delivery, vol. 6, No. 3, 11 Pages, Jul. 1991.
Superpower Inc. ID#88 (SP-145), 10 pages, Apr. 29, 2005.

* cited by examiner

METHOD AND SYSTEM FOR IMPROVED OPERATION OF POWER GRID COMPONENTS IN THE PRESENCE OF DIRECT CURRENT (DC)

CROSS-REFERENCE TO RELATED APPLICATIONS

The present application claims priority from U.S. Provisional Patent Application No. 62/454,440, filed on Feb. 3, 2017, the disclosure of which is hereby incorporated by reference in its entirety.

BACKGROUND

High voltage alternating current (AC) components, such as circuit breakers, may not be able to operate reliably when significant direct current (DC) or quasi-DC is present in transmission lines and/or components in a power grid subsystem, particularly those connected to phases of a power grid transformer. Significant DC in the power grid transmission lines and in large electrical power grid transformers, including auto-transformers, two winding transformers and generator step-up (GSU) transformers, may exist in the event of geomagnetic induced currents (GICs) or electromagnetic pulse (EMP-E3) induced currents. For example, GICs may be the result of geomagnetic disturbances (GMD) such as geomagnetic storms hitting the Earth caused by charged particle plasmas which are ejected from the sun. Another example may be the result of the explosion of a nuclear device detonated above, or substantially above, the Earth's atmosphere. Both large GIC and large EMP-E3 induced currents can occur during normal system operation during non-fault conditions.

When direct currents, such as GIC or EMP-E3 induced currents, are present in power transmission systems, numerous problems can occur. High voltage breakers may not operate reliably because they may not be able to open the circuit, and therefore the breakers will be unable to protect the power system and its components from damage when adverse conditions are experienced. Accordingly, this may result in an inability to achieve load shedding and/or islanding, or the potential inability to perform other safety-based and/or reliability-based grid operations. Also, harmonics are generated which cause the malfunction of equipment such as relays, damage of equipment such as generator rotors, induced vibration and audible noise in transformers, and excessive VAR (volts-amperes-reactive) power consumption on the power grid.

SUMMARY

The present disclosure relates generally to methods and system for ensuring operation of circuit breakers or other electrical equipment that is electrically connected on a phase of a multi-phase power line within a power grid. This can be in response to, for example, direct current (DC) or quasi-DC current at a neutral of the power line, or harmonics on power line phases.

In one aspect, a method of ensuring operation of one or more circuit breakers electrically connected on a phase of a multi-phase power line within a power grid at a substation is disclosed. The method includes detecting, at the transformer, a direct current component of a multi-phase power signal received at the transformer, the direct current component comprising a direct current received at a transformer neutral, the transformer neutral being electrically connected to a ground. The method further includes determining whether the direct current is above a predetermined threshold, the predetermined threshold being based on a determination that, above the predetermined threshold, at least one of the one or more circuit breakers electrically connected to at least one phase of the power line is incapable of reliable operation. The method also includes, in response to a determination that the direct current component is above the predetermined threshold, blocking the direct current with a direct current neutral blocking circuit between the transformer neutral and a ground.

In a second aspect, an electrical protection system includes a multi-phase transformer having a plurality of connections, each connection associated with a different power line phase of an alternating current power signal. The system also includes a direct current sensor to transmit a signal upon detection of a direct current in the neutral of the transformer, and at least one breaker electrically connected to a power line phase of the transformer. The system further includes a direct current neutral blocking circuit electrically connected between the transformer neutral and a ground. The system also includes a processor to receive the signal from the direct current sensor, the processor electrically connected to the at least one breaker and configured to open the at least one breaker electrically connected to a power line phase of the transformer upon receiving the signal from the direct current sensor in response to a determination at the processor that the direct current in the neutral is above a predetermined threshold. Above the predetermined threshold, at least one of the one or more circuit breakers electrically is connected to at least one phase of the transformer is incapable of reliable operation.

In a third aspect, an electrical protection system includes a transformer having a plurality of connections. The system also includes a direct current sensor electrically connected at a transformer neutral, and at least one breaker electrically connected to a power line phase of the multi-phase transformer. The system also includes a direct current neutral blocking circuit electrically connected between the transformer neutral and a ground. The system further includes a processor electrically connected to the direct current sensor and electrically connected to the at least one breaker, the processor configured to open the at least one breaker electrically connected to a power line phase of the transformer in response to a determination that the direct current in the neutral is above a predetermined threshold. Above the predetermined threshold, at least one of the one or more circuit breakers electrically connected to at least one phase of the transformer is incapable of reliable operation.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
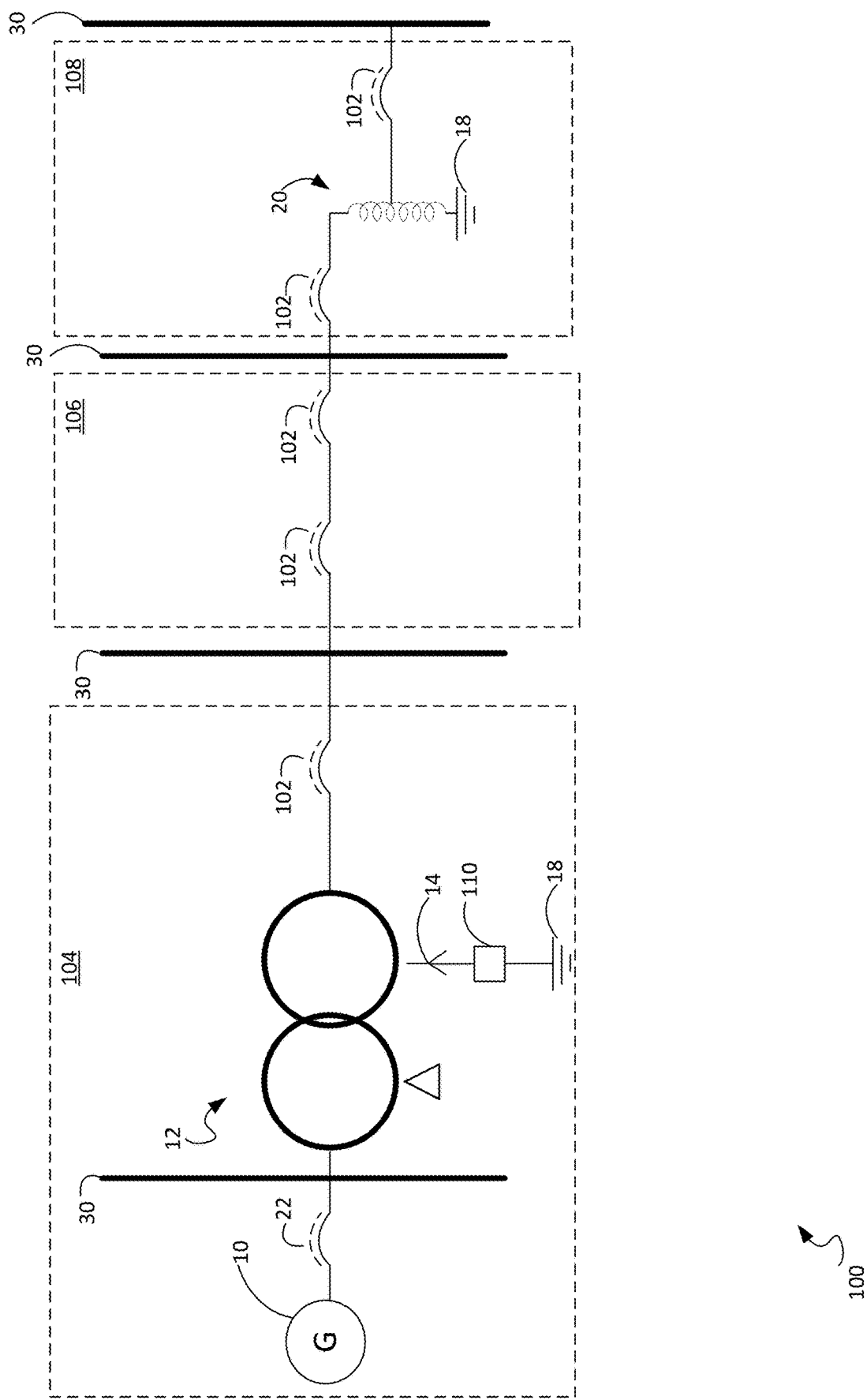
FIG. 1 is a schematic diagram of a portion of the power grid in which protection is desirable.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general the present disclosure relates to a method and system for providing the ability to operate electrical and electronic control equipment used in operation of a high voltage power grid, as shown in the example circuit 100 of FIG. 1. The method and system described herein are particularly adapted for protection of circuit components in the event of a current having a DC component that would otherwise make it impossible and inadvisable to operate such equipment because of the risk of damage to the power grid components. Embodiments of the method and system incorporate circuit breakers that are connected to the phases of a multi-phase transformer system at a power substation. In some embodiments, the system automatically detects such DC currents and triggers the system into a protective mode. In still other embodiments, a threshold DC level is used to trigger the system into a protective mode.

In particular applications, if an extremely high intensity GMD or a nuclear EMP event should occur the induced quasi-DC GIC currents in the power system could be such that it becomes impossible to effectively shut down the power grid to be able to protect it from catastrophic damage. The GIC quasi-DC current in the transmission system, related to either an extremely large GMD or EMP event, could be greater than the nominal AC current on the line, (for example on the order of 98 to over 160 amps DC depending on the grid voltage and load, (i.e. 345 kV up to 765 kV). The specific conditions for effective shut down (i.e., currents at which power line circuit breakers may not operate correctly) are illustrated below in Table 1:

TABLE 1

Conditions of Mis-Operation of Power Line Circuit Breakers

| | Grid Voltage (kV) | Three Phase Transfomer Size (MVA) | Transformer AC Current per Phase (Amps) at %20 Load | Peak Current per Phase (Amps) at %20 Load | DC Current Levels (Amps) above which AC Waveform Zero Crossings do not occur |
|---|---|---|---|---|---|
| Power Plant Generator Step Up Transformer | 765 | 750 | 113 | 160 | 160 |
| Substation Auto-Transformer | 500 | 300 | 69 | 98 | 98 |
| Substation Auto-Transformer | 345 | 300 | 100 | 142 | 142 |

It is noted that currents in excess of the above levels may result in a lack of zero crossings in the current waveform that is present on each phase of the power line. This can therefore cause mis-operation of power line circuit breakers, which rely on current zero crossings to operate properly, in the area of an event.

Therefore to protect against such a situation, a neutral blocking device attached to the HV power transformers (both generator step-up as well as step-down transformers) can be employed to provide protection against these quasi-DC GIC currents. This protection would be automatically initiated whenever the quasi-DC currents exceeding a level of, for example, 5 Amps or more is automatically detected and then used to trigger the blocking of the DC component. This will eliminate the quasi-DC current in the area of the generator step-up transformers and two winding step down transformers. Furthermore, neutral blocking devices can also provide significant reductions of the quasi-DC currents when applied to down-stream auto-transformers. This protection against induced quasi-DC currents thereby allows the composite current waveform of AC plus quasi-DC current to continue to provide a current waveform with zero crossings which thereby allows the HV line breakers to be opened to allow the line to be shut down in the case of an extremely large GMD or a nuclear EMP event in the area. Other advantages are present as well, and reflected in the claims as included herein.

Referring now to FIG. 1, a schematic diagram of a portion of the power grid 100 is shown that illustrates the primary power components of a high voltage (HV) or extra high voltage (EHV) electrical power generation and transmission system (345 kV to 765 kV). The electrical power at generation substation 104 is generated by generator 10 and stepped up to a higher transmission voltage by generator step-up (GSU) transformer 12. Transformer 12 has a delta-wye primary to secondary configuration with neutral grounding connection 14 on the secondary wye side. FIG. 1 illustrates the three phases of transformer 12 as a single line for simplicity. High voltage breakers 102 are electrically connected to the power line phases of transformer 12. DC neutral blocking system 110 is electrically connected between transformer neutral 14 and ground 18. A power generation substation 104 is electrically connected to three-phase transmission line system 106 and includes breakers 102 on the power lines between bus bars 30. Another set of breakers 102 are electrically connected between the transmission line system 106 and the high voltage side of step-down transformer 20. Another set of breakers is electrically connected between the low voltage side of step-down transformer 20 (e.g., an autotransformer) and bus bar 30 leading to the substation local transmission line system.

It is noted that the example shown, breakers may be placed in the vicinity of transformer 12, as well as the autotransformer, shown as step-down transformer 20. In either instance, monitoring of quasi-DC currents and harmonic signals on the power signal phases can be important, since detection and protection (e.g., via introduction of a DC neutral blocking circuit at the transformer) can be used in a way that ensures proper operation of the breakers included in the vicinity of such transformers.

Specifically, in the event of a current having a DC component, circuit breakers might not open without arcing and could catastrophically fail. In some embodiments, the DC component is decoupled from ground by decoupling the transformer neutral from ground using a DC neutral blocking system that connects between a transformer neutral and ground. A particular example of such a circuit is illustrated in FIG. 2.

Figure 2:
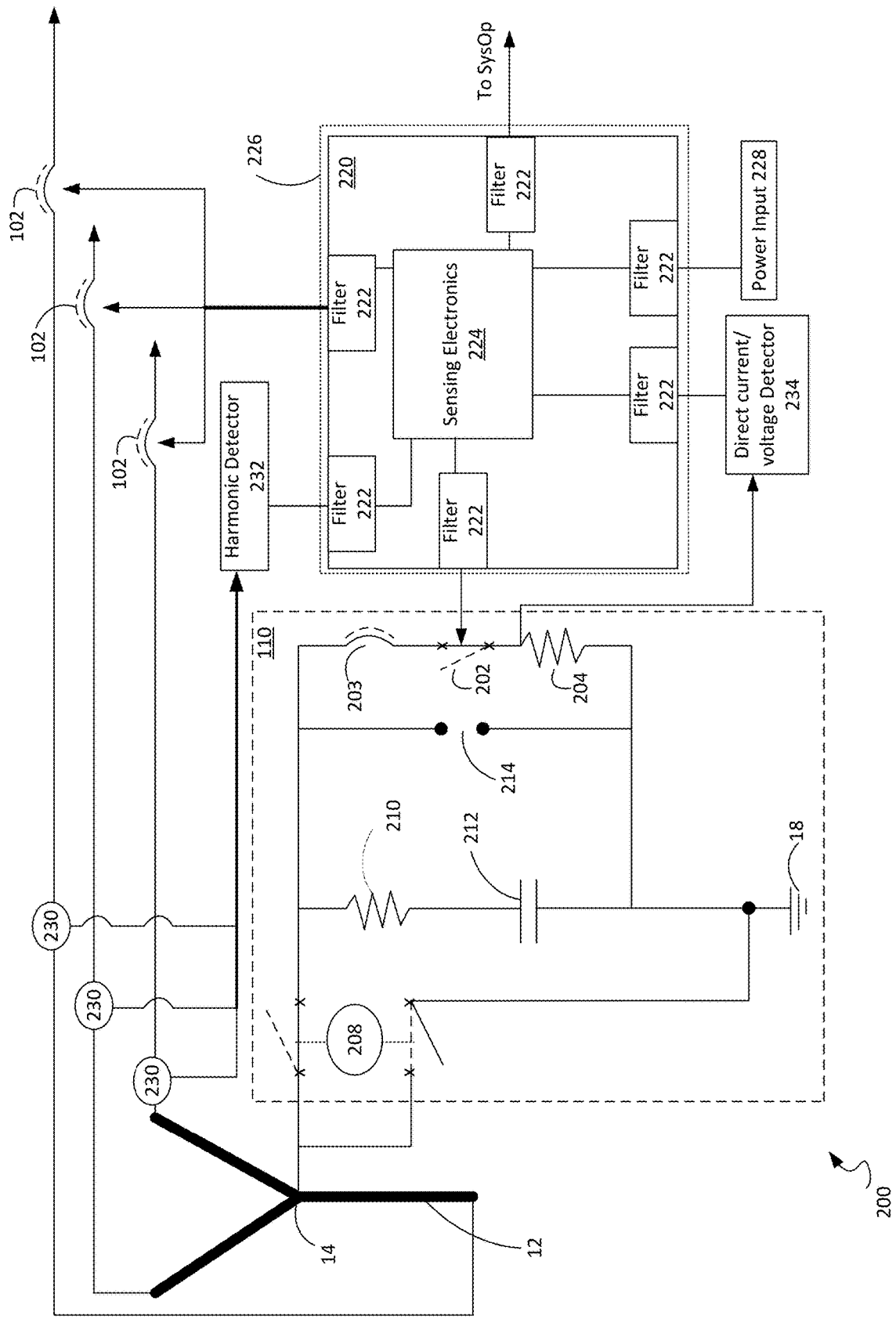
FIG. 2 is a circuit diagram of a circuit for transformer isolation and neutral blocking protection.

As seen in FIG. 2, a particular embodiment of an example circuit 200 is shown that provides a DC neutral blocking system as would be used in accordance with the following disclosure. The electrical protection circuit 200 generally is connected between a transformer neutral 14 of a transformer 12 and an electrical ground 18. The electrical protection circuit 200 includes a switch assembly including an electrically controlled DC switch 202 connected between the transformer neutral 14 and electrical ground 18. A shunt resistor 204 can be connected between the DC switch 202 and electrical ground 18, which can be used to sense DC current passing between the transformer neutral 14 and electrical ground 18. In certain embodiments, the shunt resistor 204 has a lower resistance, on the order of a few milliohms, to allow for a low impedance ground connection through the switches. In another embodiment, the shunt resistor 204 could be replaced by a Hall effect current sensor or other non-contact current sensor. Additionally, an electrically-controlled alternating current (AC) switch 203 can be connected between the transformer neutral 14 and the DC switch 202, for example to protect the DC switch 202 from high voltages during a ground fault event. As an example, one or both of the alternating current (AC) switch 203 and the DC switch 202 may comprise circuit breakers. In some embodiments, the electrical ground 18 can be connected to a station ground grid, while in other embodiments it can be connected to the transformer housing which is in turn grounded.

The DC switch 202 can be any of a variety of fast acting electrically-controlled switches, such as a high voltage circuit breaker switch. In the embodiment shown, the DC switch 202 is a normally-closed connection which can be opened rapidly via an electrical control input. Example sensing and control circuitry that can be connected to the control input is discussed further in connection with FIG. 3, below. In some embodiments, when the DC switch 202 opens, a signal from the DC switch 202 then opens the alternating current (AC) switch 203. Shortly thereafter, the DC switch 202 closes but the alternating current (AC) switch 203 remains open and protects the DC switch from any overvoltage on the neutral connection.

A DC current blocking component is connected in parallel with the switch assembly between the transformer neutral 14 and the electrical ground 18. As further explained in the examples below, the DC current blocking component can include one or more direct current blocking devices (e.g., capacitors or resistors) capable of blocking a current path between the electrical ground 18 and the transformer neutral 14, to prevent damaging DC or quasi-DC ground currents in the transformer neutral 14, which would in turn cause possible damage to the transformer 12 or collapse of a power grid. In the example shown, the DC current blocking component includes resistor 210 and capacitor 212, which can be, for example, one capacitor or a plurality of capacitors in parallel. Although in certain embodiments a one or two Ohm impedance (60 Hz) capacitance bank is used, other types of capacitors could be used as well. However, depending on the specific application, either a capacitive or resistive (or some combination thereof) blocking device could be employed in the electrical protection circuit 200. Furthermore, the DC current blocking component is hard wired to the electrical ground 18, therefore providing an alternating current (AC) ground for the transformer (or other power component) even if the DC switch 202 and alternating current (AC) switch 203 inadvertently malfunction.

In normal operation, the transformer neutral 14 is grounded through the switch assembly. That is, the switch assembly, including the DC switch 202 and the alternating current (AC) switch 203, is normally in a closed position. This corresponds to the standard grounding configuration used by utilities; consequently, a grounding system such as is disclosed herein does not require readjustments to the utility electrical equipment to which it is attached prior to use. In this first (or normal) mode of operation, the DC current blocking component is not energized, because the switch assembly creates a short around it. If a ground fault is detected while operating in this normal operational mode (e.g., no GIC detected), the grounding through the switch assembly will handle the ground fault current until the power system relays isolate the faulted equipment. As described in greater detail with respect to FIG. 8, when the presence of various conditions are detected within the electrical protection circuit 200, the switch assembly is opened by the control circuit 220. In this second (or GIC protective) mode of operation the DC current blocking component provides the alternating current (AC) grounding for the transformer neutral. This mode of operation protects against DC or quasi-DC currents associated with either GMD and EMP-E3 events. This protective mode remains operational until the control device 220 closes the switch assembly 202.

In some embodiments, to account for the extremely unlikely event that a GMD (or EMP-E3) and a ground fault occur simultaneously, an overvoltage protection device 214 is included in parallel with the switch assembly and the DC current blocking component. In some embodiments, the overvoltage protection device 214 is configured to trigger at a voltage that is below the voltage level that would damage either the transformer or the DC current blocking component. In this manner, the overvoltage protection device 214 operates to protect the DC current blocking component from potentially damaging voltages when the electrical protection circuit 200 is operating in the GIC protective mode. In some embodiments, the switch assembly is then reclosed by a signal from the control circuit 220 based on detecting a current passing through the overvoltage protection device 214. Therefore the overvoltage protection device 214 provides the initial grounding within one cycle of the ground fault and until the switch assembly 202 can be reclosed.

In this example, the overvoltage protection device 214 includes a triple spark gap. Examples of triple spark gaps are described in U.S. Ser. No. 14/185,458, filed on Feb. 20, 2014 and titled OVERVOLTAGE PROTECTION FOR POWER SYSTEMS, the disclosure of which is hereby incorporated by reference in its entirety. In other embodiments, the overvoltage protection device 214 comprises a single spark gap. Further, in some embodiments, the overvoltage protection device 214 may comprise a surge arresting component disclosed in U.S. Ser. No. 14/185,458, a varistor, etc.

In some embodiments, a maintenance bypass switch 208 is included that operates to deactivate the electrical protection circuit 200 by connecting the transformer neutral 14 directly to electrical ground 18. Examples of maintenance bypass switch 208 include trapped key interlocks such as kirk key interlocks. In this manner, the electrical protection circuit 200 may be removed from operation for inspection, maintenance, repair, etc.

By opening the switch assembly, the DC current blocking component shown in FIG. 2 provides the alternating current (AC) grounding path for the transformer neutral 14, while at the same time blocking the DC or quasi-DC currents induced by a geomagnetic storm or EMP-E3 event. Blocking the quasi-DC currents protects the transformer 12 from entering half-cycle saturation which in-turn can cause transformer excessive reactive power losses, overheating, damage, or even failure. Additionally, blocking the quasi-DC current also prevents the generation of harmonics in the power system which in-turn can prevent the tripping of relays, the disconnection of power compensation components, excessive reactive power burden, and potentially the collapse of either small or large portions of the power grid.

Further, to increase the reliability of the DC current blocking component, either a parallel bank of multiple capacitors or resistors could be used such that if one or more of these capacitors or resistors fail the others would still be available as blocking components.

In the embodiment shown, the control circuit 220 includes sensing electronics 224 configured to receive inputs from a harmonic detector 232 and a direct current detector 234. The harmonic detector 232 is electrically connected to harmonic sensors 230 that are positioned on power line phases. The harmonic sensors 230 can be implemented using a capacitive voltage transformer located on one of the transformer phases. The direct current detector 234 is electrically connected at the shunt resistor 204.

In the embodiment shown, the sensing electronics 224 can be implemented using a processor or other programmable circuit, and are positioned within an electrically shielded enclosure 226. The shielded enclosure 226 includes a plurality of filters 222 positioned at a periphery to prevent high frequency, high power electromagnetic signals from entering the enclosure, thereby exposing the sensitive control and sensing electronics to potential interference and damage. The filters 222 can typically be a low pass or band pass filter with surge suppression to suppress any high voltage signals from entering the enclosure. In the embodiment shown, the shielded enclosure 226 is an EMP/IEMI faraday shielded enclosure with conductive gaskets around all door openings to provide radiative protection from electromagnetic frequencies typically from about 14 kHz to 10 GHz.

It is noted that, in some embodiments, the control circuit 220 will include the harmonic detector 232 and direct current detector 234. For example, the sensing electronics 224 can be implemented to include a programmable detector capable of receiving signals from the harmonic sensors 230 and/or from the input from shunt resistor 204. Various other applications are possible as well.

It is noted that alternative embodiments of such an electrical protection circuit 200 may be utilized as well, in different embodiments of the present disclosure. Example embodiments are further described in U.S. Pat. Nos. 8,878,396 and 8,537,508, the disclosures of which are hereby incorporated by reference in their entireties.

Referring to FIGS. 1-2, it is noted that although the transformers included herein are multi-phase transformers, aspects of the present disclosure can be implemented at transformer subsystems having separate, single-phase transformers electrically connected to different phases of a power signal. Accordingly, the present disclosure should not be limited to such multi-phase transformers.

Figure 3A:
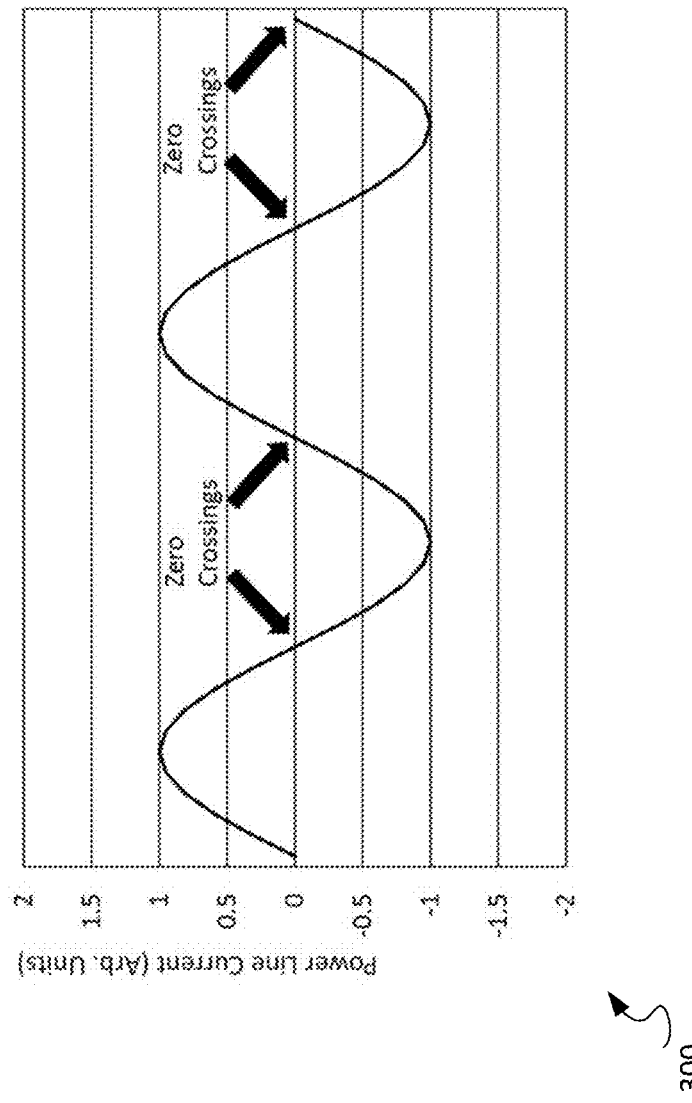
FIG. 3A illustrates a power line current waveform which does not have a DC offset current.
Figure 3B:
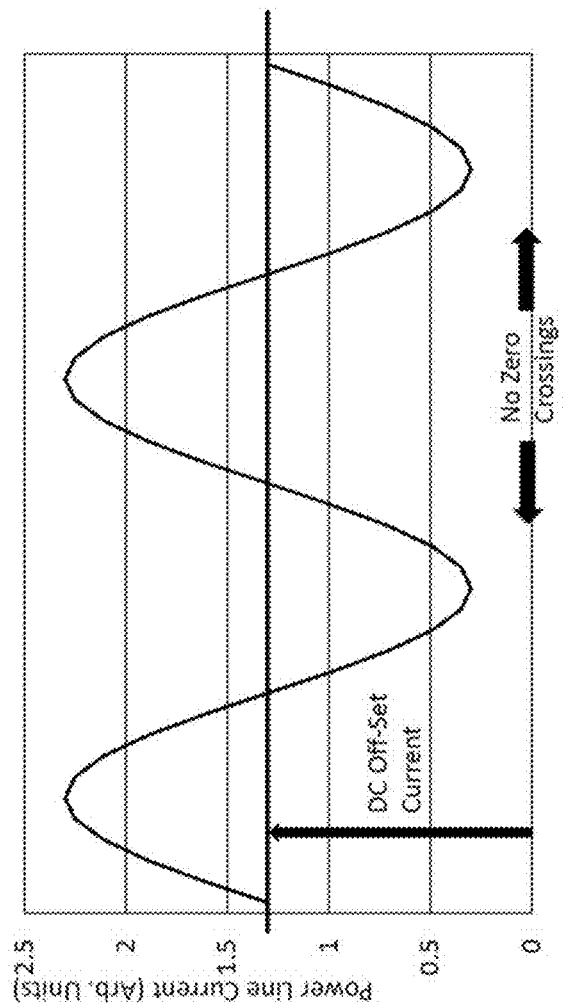
FIG. 3B illustrates a power line current waveform in the presence of a DC offset current.
Figure 4:
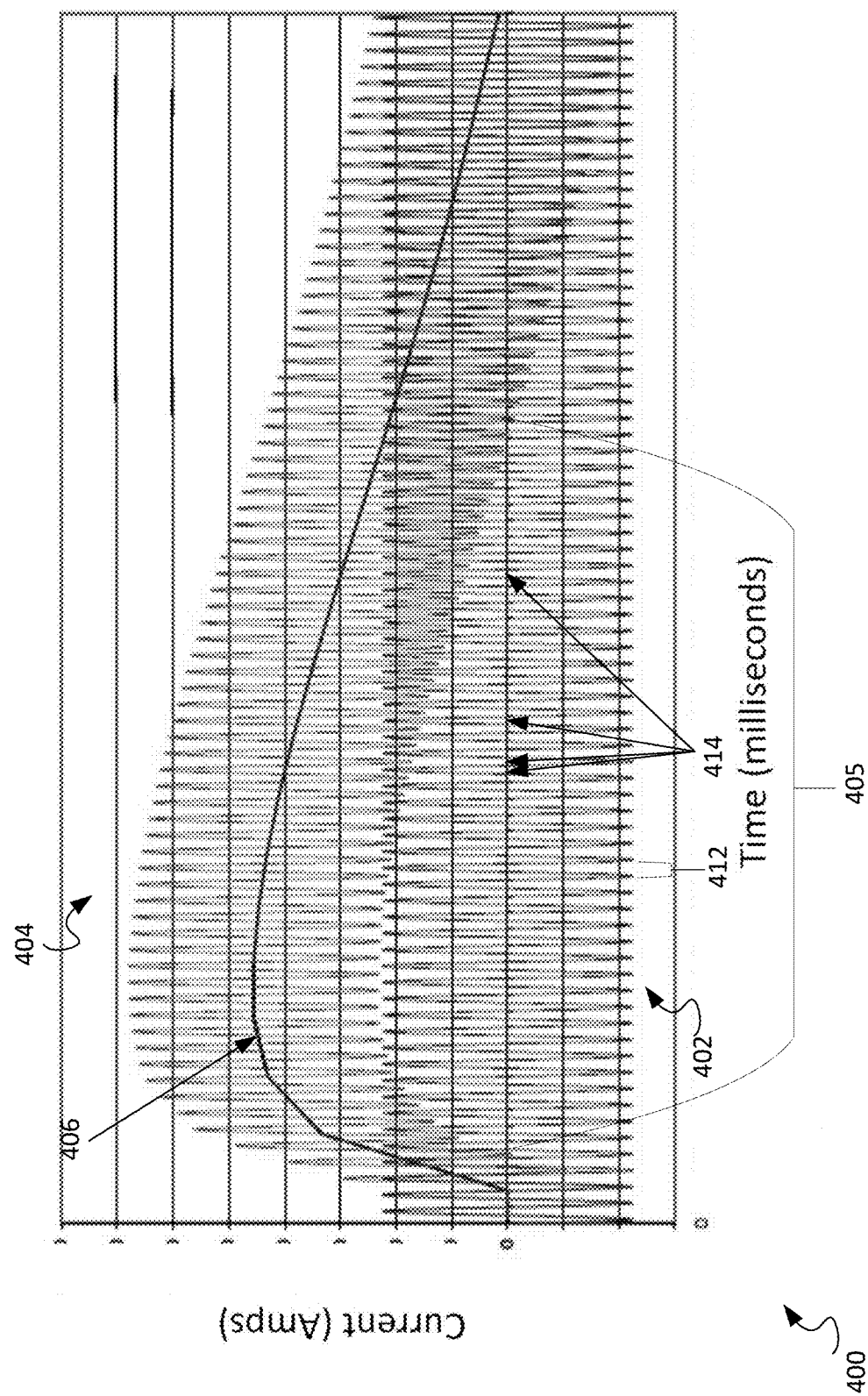
FIG. 4 illustrates a power line current waveform in the presence of an EMP-E3 caused quasi-DC induced current.

Referring now to FIGS. 3-7, example waveforms are illustrated that demonstrate the potential for damage to electrical components connected to power line phases, as are illustrated above. FIG. 4 shows example waveforms at one of the power line phases of transformer 12 both in the absence and presence of a large induced DC event such as from an EMP-E3 event. Waveform 402 illustrates the alternating current (AC) waveform of a HV or EHV transmission circuit having cycle time 412 in the absence of a DC offset for multiple cycles over a period of time. Waveform 402 includes zero crossing events 414. At zero crossing events 414, the current of waveform 402 switches from positive to negative, or from negative to positive, indicating the direction of the flow of electrons in AC waveform 402. Because of zero crossing events, any circuit breakers attached to the phase are capable of being actuated, for the reasons outlined above.

Referring back to FIG. 1, at a step-down autotransformer (e.g., autotransformer 20), it is noted that, in some embodiments, in the context of the power grid as illustrated in FIG. 1, a switching procedure on an auto-transformer is to open low side breakers first which removes AC load current and thereby allow the breakers on the high voltage side to open to de-energize the transformer. If the opening of the low side breakers is successful, then the only current on the high side breakers will be quasi-DC (i.e. GIC or EMP-E3 current). Under this sequence, there will be no AC zero crossings of the current waveform as shown in a comparison between FIGS. 3A and 3B. Therefore, under high quasi-DC currents (GIC or EMP-E3) the switching of transformers out of operation is prohibited. Accordingly, although the voltage and current features in Table 1 above represent example values at which such DC blocking may be triggered, there may be other embodiments in which a lower current level may also be advisable to employ the introduction of such DC blocking device/system in combination with the operation of a circuit breakers on the high voltage transmission phases. It is noted that the selected level should not be too low, however, to result in over-frequent operation of such circuit breakers.

In some example cases, the selected trigger threshold could be below a threshold at which transformer damage may occur. This threshold may be set to ensure a zero-crossing, as shown in FIG. 3A for voltage or current waveform levels at each of the phases which in-turn ensures normal protective operation of the power grid. However, it is noted that this may not necessarily be the case. In particular, the selected levels may be set to ensure that the circuit breakers electrically connected to the phases of the transformer operate in the conditions desired, such as during the following events: (1) maintenance activity—during severe GMD events, "Reliability Coordinator" procedures call for "Conservative Operations", which is a prohibition on switching except in emergencies; (2) removing at risk transformers; (3) removing at risk generators; (4) islanding or blacking out a portion of the grid; (5) switching Static VAR Compensators (SVCs) or series capacitors in and out of service to keep voltage steady in the presence of quasi-DC currents; or (5) to automatically to protect equipment or grid stability according to electronic relay commands.

Referring to FIG. 4, such non-zero crossing effects are illustrated in the waveforms included in graph 400. In particular, waveform 404 illustrates the AC waveform of a HV or EHV transmission circuit having cycle time 412 in the presence of induced DC event 406 for multiple cycles over a period of time. Waveform 404 does not include any zero crossing events for multiple cycles (e.g., in region 405) because of the offset caused by induced DC event 406. Circuit breakers depend on the waveform in the transmission line including zero crossing events 414 in order to operate. If induced DC event 406 is adequately large such that the waveform in the transmission line does not include zero crossing events for multiple cycles of the waveform, circuit breakers may not open or the current will arc across the breaker, preventing both reliable operation of breakers and protection of electrical components connected to transmission system. Accordingly, by way of comparison between a normal AC waveform and the AC-DC composite waveform, zero-crossings on power line phases may be affected causing issues on each phase.

Figure 5:
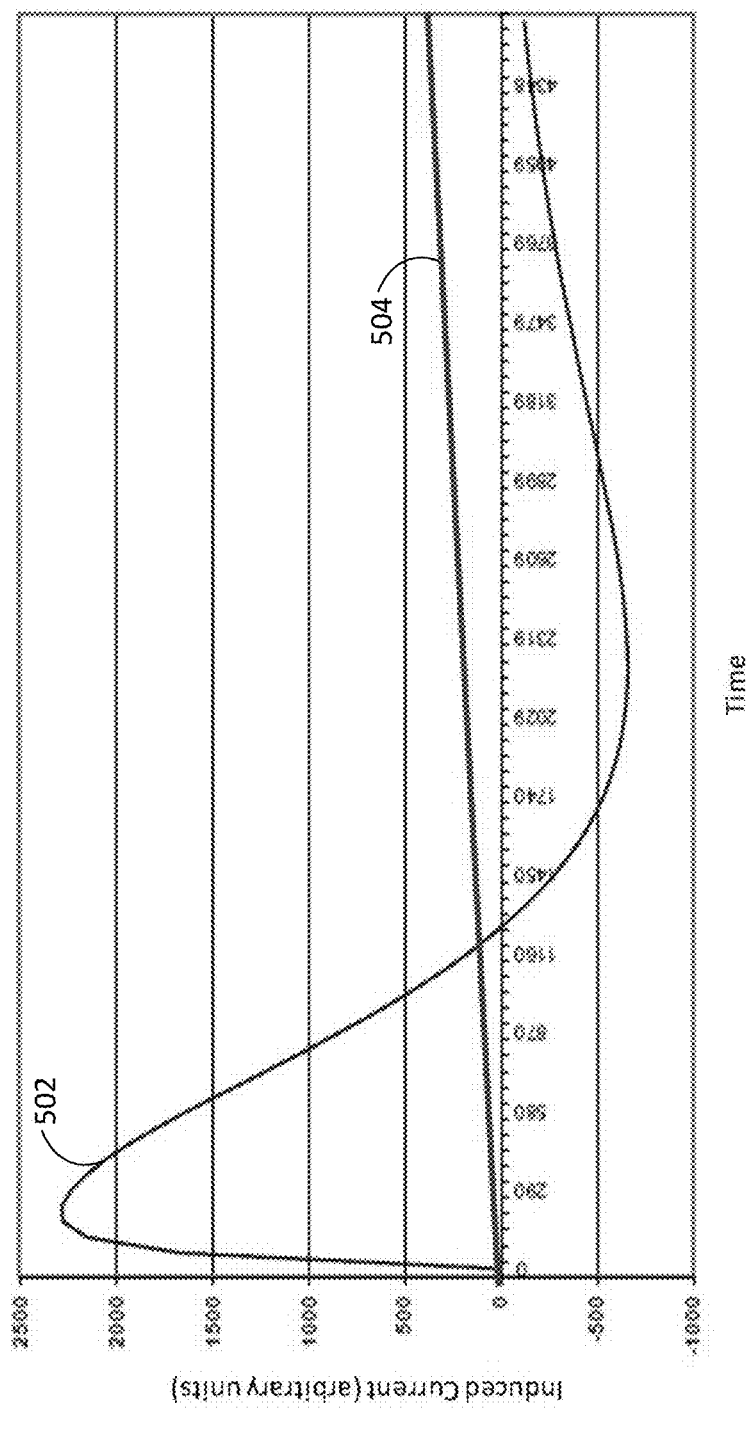
FIG. 5 illustrates the magnitude and rise times of a typical quasi-DC GMD GIC versus an induced EMP-E3 pulse.

FIG. 4 illustrates only the effect of a Blast Wave portion of the E3 signal from an EMP event. The EMP-E3 Heave Wave portion is slower in rise, but overlaps the Blast Wave creating a composite wave, which could extend the period without zero crossing from seconds to over a minute. FIG. 5 illustrates additional instances in which induced quasi-DC current can appear at a transformer neutral and result in the mis-operation of circuit breakers as described above. For example, FIG. 5 illustrates a chart 500 that includes a waveform 502 representative of an E3 component of an EMP signal, as well as a waveform 504 representing a geomagnetic disturbance signal (GMD). As seen in FIG. 5, both EMP and GMD signals provide quasi-DC current, with the waveform 502 exhibiting significantly faster rise time and shorter duration than the GMD disturbance.

It is noted that the impact area of either a GMD or nuclear EMP event could be rather extensive and is dependent on the magnitude of the GMD event or the magnitude of the nuclear EMP attack. In the case of an EMP attack, multiple nuclear devices and/or the deployment of multiple re-entry vehicles with multiple stage devices could be imagined which could result in a widespread impact to a country's power grid. It would therefore be only reasonable to assume that once a large GMD or EMP event has been detected by high GIC currents in a given area that the detection should be used to trigger all DC neutral blocking devices in a very large area, i.e., 20 to 30 states, in order to ensure the protection of the power grid in this extended area.

Figure 6:
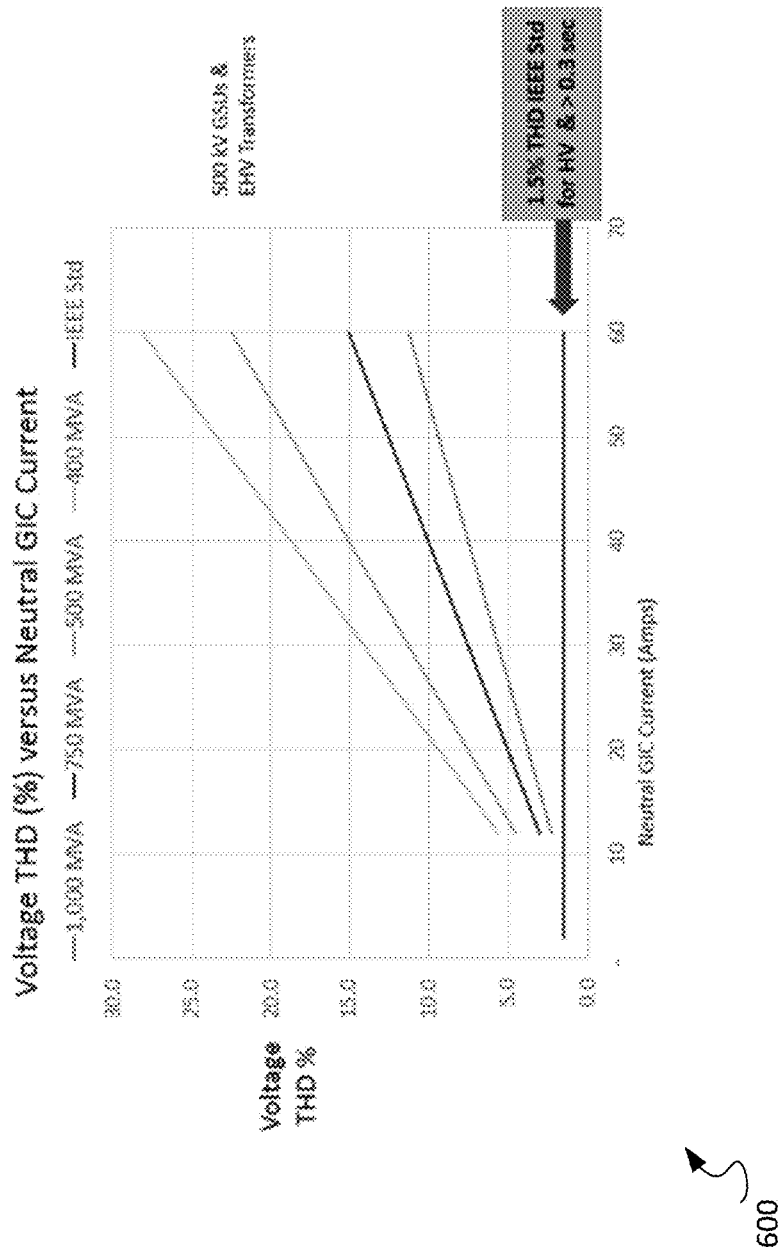
FIG. 6 illustrates the magnitude of total harmonic distortion (THD) versus induced transformer neutral GIC current for four HV transformer capacities (MVAs)
Figure 7:
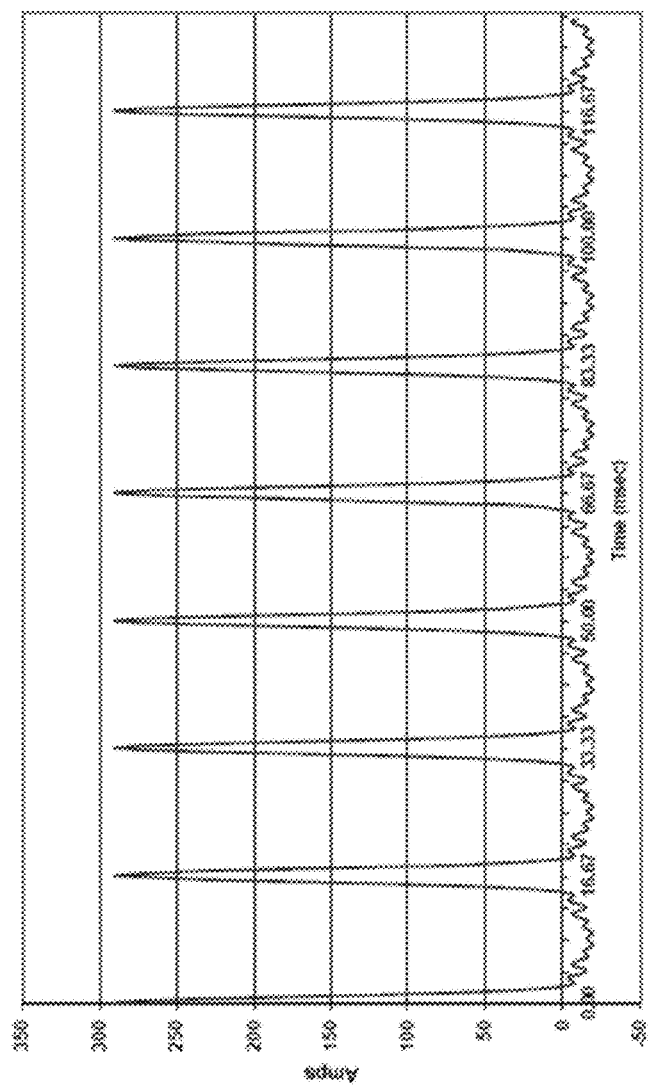
FIG. 7 illustrates saturation in a transformer assembly caused by induced GIC or EMP-E3 currents.

FIG. 6 represents a chart 600 showing the sensitivity of various transformers to GIC and the levels of harmonic distortion in the voltage signal that can be produced. In particular, induced quasi-DC current, such as the currents generated as reflected in FIG. 5, can result in an offset on the phases, which eventually may lead to half-cycle saturation of the transformer core. FIG. 6 illustrates, for different sizes of transformers, a voltage total harmonic distortion (THD) as a percentage of overall voltage. In particular, the saturation of power transformers by induced DC or quasi-DC currents can result in the generation of significant harmonic levels on the power transmission lines. For example, for transformers in the range of 400 to 1,000 MVA (as shown), the IEEE 519-2014 THD standard for voltage total harmonic distortion (THD) of 1.5% will be exceeded by DC currents which are larger than 5 to 10 amperes. This in turn adversely affects the operation of power system relays and breakers as well as other power control equipment. As seen in the waveform 700 of FIG. 7, such harmonics can drastically distort the power signal on a phase with significant harmonics. This illustrates the magnetizing current of the transformer core under half cycle saturation. This magnetizing current, when under half-cycle saturation, will cause harmonics on the phase line. It is noted that large volt-amp-reactive (VAR) demands to the power system can be experienced when HV transformers experience GIC or EMP-E3 induced half-wave saturation as depicted in FIG. 7. By employing DC current neutral blocking systems, unwanted vibration and audible noise in power grid components as well as large VAR demands can be greatly reduced or eliminated. Additionally, the installation of DC current neutral blocking systems on transformers in a power grid has been shown in power system power flow modeling results to be effective in reducing power grid reactive power demand (VARs). This is shown in FIG. 7 where the half-wave saturation of a transformer, caused by a quasi-DC (or DC) off-set from either an EMP or GMD event, results in a high current demand when the transformer windings are saturated. This high periodic current demand results in the demand for a reactive power, known as a volt-amp-reactive (VAR) power demand. Such a demand can result in a power demand that causes a drop in the transmission voltage and if large enough can result in a voltage collapse of the power system. Accordingly, additional economic benefits can be realized in the system, for example the reduction of reactive power (VAR) consumption. In one possible example, at around 10 A DC at a part of the grid, a circuit triggering action is taken. More generally, where AC voltage collapse occurs, in that the AC voltage drops below a number acceptable to a power grid, e.g. 90% of ideal, such an action can be taken to mitigate such effects.

In addition to the above, the harmonic signals can cause further undesirable effects, thereby influencing the threshold at which neutral blocking is introduced. For example, installation of neutral DC current neutral blocking systems on HV and EHV transformers, can be used to protect rotors of a power generation system, as described in A. Rezaei-Zare and L. Marti, PESGM2013-000013, IEEE PES, July 2013, Vancouver, Canada, the entirety of which is incorporated by reference herein. Specifically, quasi-DC currents induced in power transmission lines, on the order of 50 amperes per phase or more, can result in the generation of large harmonics in the secondary current waveforms of generator step-up transformers. Such quasi-DC currents induced by geo-magnetic storms (GMD) or an EMP-E3 event will exceed the IEEE 519 standard for harmonics on power line transmissions. Such harmonics can then induce currents in the primary of these GSU transformers which then flow back into the generator rotors of the power generators as seen, for example, in FIG. 1.

Figure 8:
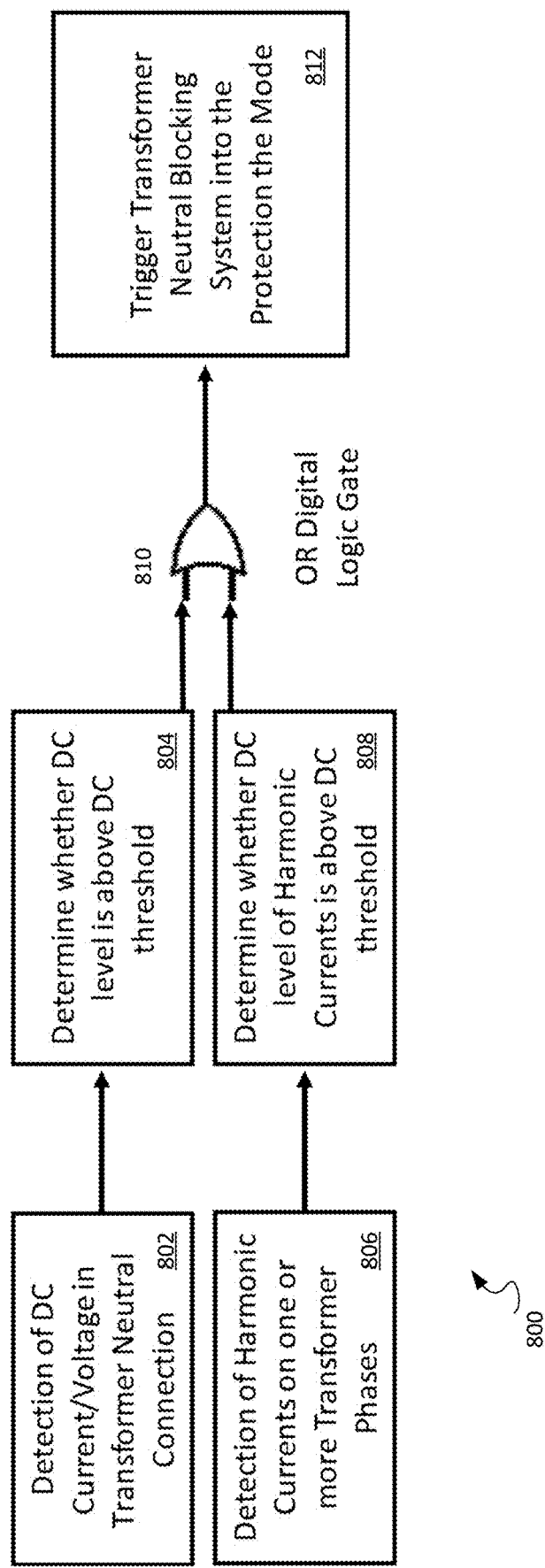
FIG. 8 is a flow diagram illustrating one embodiment of the method.

Accordingly, and as noted above, there are a number of instances in which a transformer neutral may need to have the direct current component blocked on its ground connection. FIG. 8 illustrates a method 800 of operation to protect electrical components in circuit 100. The method 800 can be performed by, for example, sensors and electronics depicted and described above in connection with FIG. 2. At 802, direct current and/or voltage can be detected, such as in transformer neutral 14 to ground 18 connection, which may be indicative of induced DC events in one or more of the power line phases. Direct current that is detected at transformer neutral 14 can be assessed at 804 to determine whether the DC level is above a predetermined threshold above which some other power grid component, such as circuit breakers 102, do not reliably operate.

The saturation of power transformers by induced DC events can result in the generation of significant harmonic levels on the power transmission lines. For transformers in the range of 400 to 1,000 MVA, the total harmonic distortion (THD) will be exceeded by DC larger than 5 to 10 amperes. This in turn adversely affects the operation power system relays, breakers as well as other power control equipment. At 806, power line harmonics caused by saturation of transformers in circuit 100 because of induced DC events can be detected on one or more of the power line phases of transformer 12. The detected power line harmonics can be assessed at 808 to determine whether the DC level of the harmonics are above a predetermined threshold above which some other power grid component, such as relays or circuit breakers, do not reliably operate.

The determinations of whether the DC detected at transformer neutral 14 exceeds a predetermined threshold at 804 and whether the DC level of the harmonics are above a predetermined threshold at 808 can be combined at digital logic OR gate 810, and the result can then trigger the DC neutral blocking system 110 at step 812 if either threshold at 804 or 808 is exceeded. The DC neutral blocking system allows for the reliable operation of power grid components, such as transformer, relays, and circuit breakers.

The above predetermined thresholds can be set according to several criteria. One criteria is to use the circuit breaker manufacturer's specification. Another criteria is to set the threshold low enough to be certain of zero crossings 414, which in-turn will ensure that normal operation of power grid components. Table 1, above, shows example current levels at which circuit breakers may experience a non-operable state. Another criteria is to set the threshold to a level that the transformer can withstand without causing adverse harmonics, or damage to the transformer or other power system components.

Figure 9:
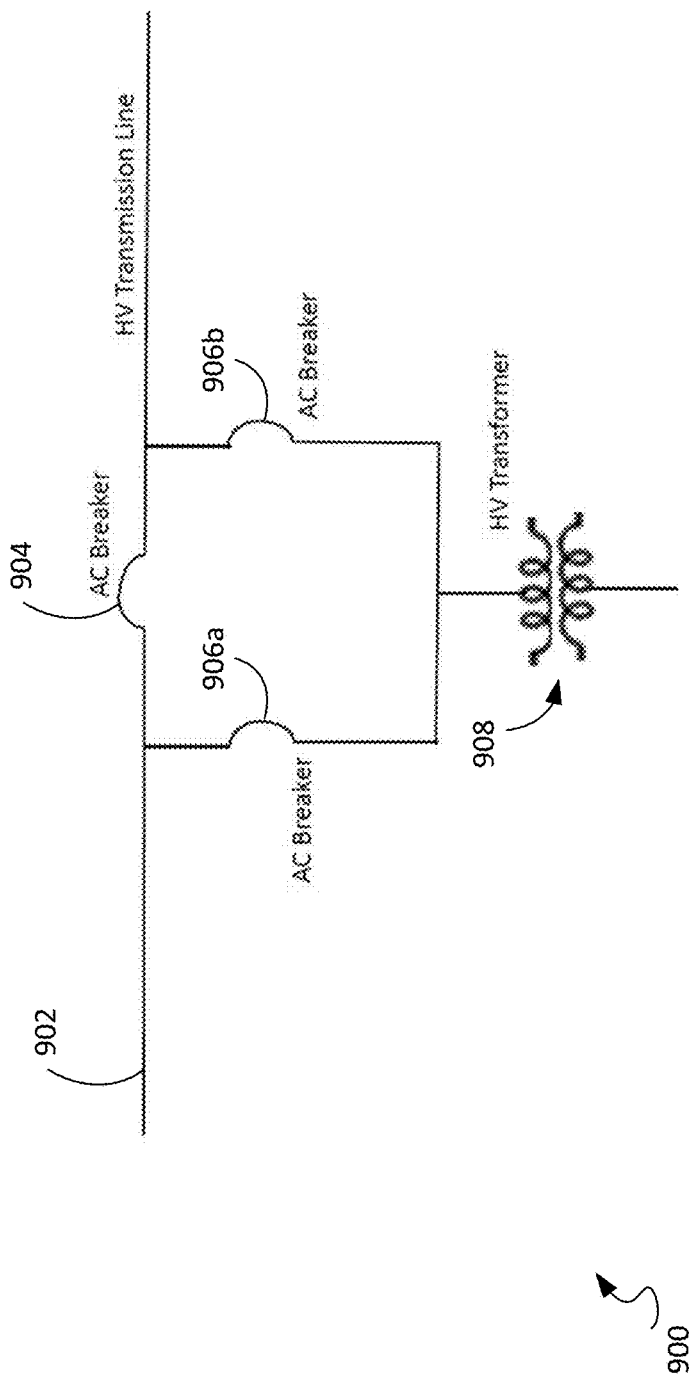
FIG. 9 is an example circuit in which the method can be used to prevent the mis-operation of relays and breakers.
Figure 10:
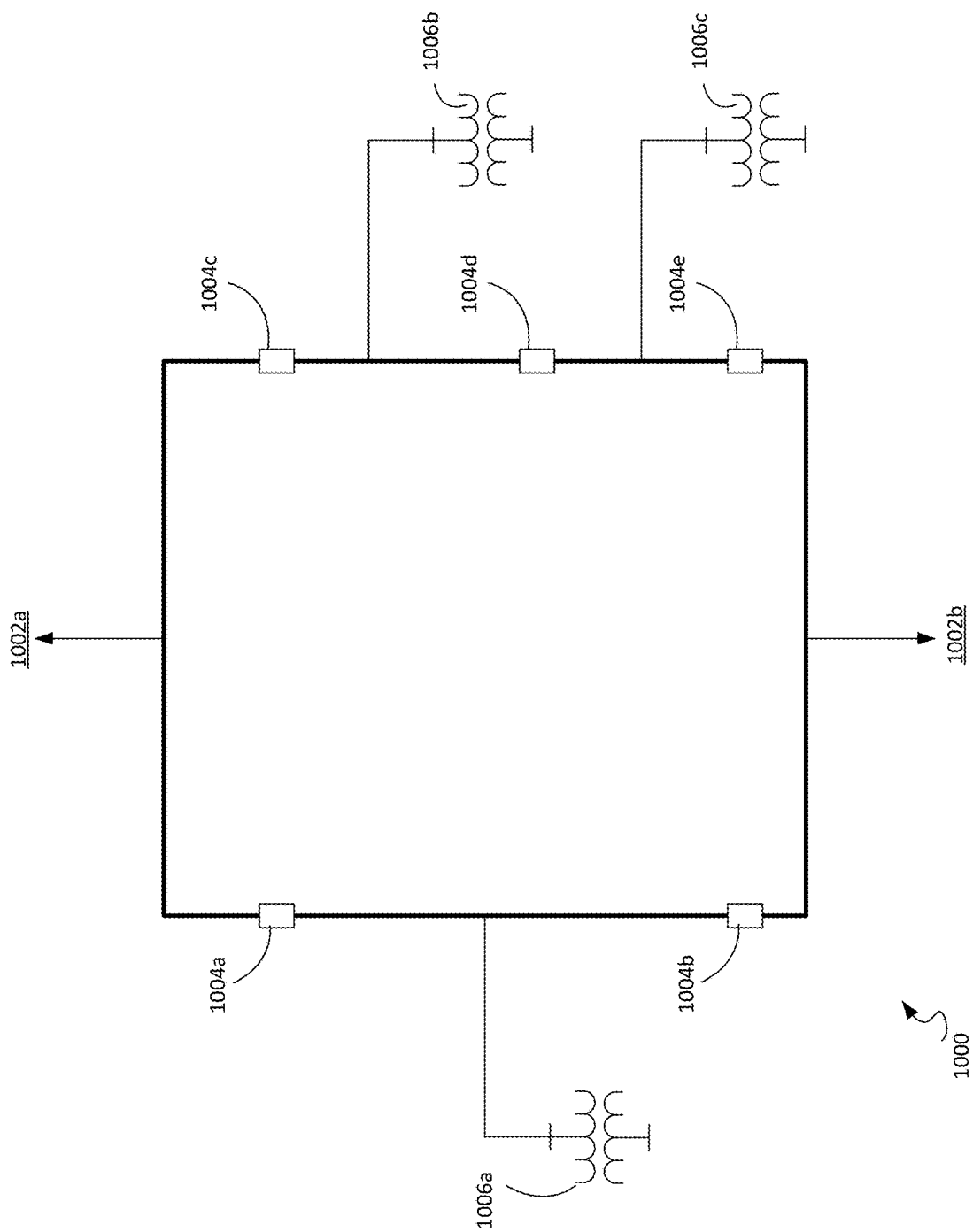
FIG. 10 is another example circuit in which the method can be used to prevent the mis-operation of relays and breakers.

FIGS. 9-10 illustrate specific example scenarios in which switching of circuit breakers included in a power grid may be advantageous. FIG. 9 illustrates a power grid section 900 in which power can be supplied to a high voltage transformer from one of two selectable directions on a high voltage transmission line 902. The two directions can be separated by a breaker 904. Separate branching breakers 906*a-b* can lead to the transformer 908, which then provides stepped-down power to a load. By monitoring power at a transformer and subsequently controlling breakers in the vicinity of that transformer, operation of the transformer can be reliably maintained, as well as operation of the breakers.

By way of contrast, if conditions are such that it is determined that the local power grid should be taken out of service because of unusual conditions that could cause damage to critical components, the two breakers 906*a-b* shown in FIG. 9 would be commanded by the controllers to open sequentially to allow the safe shut down of the local power grid. In the presence of either a quasi-DC or DC current at least one of the parallel AC breakers would most likely open as commanded because the composite AC plus DC waveform would have a zero voltage crossing to allow at least one of the breakers to open. To complete the shut-down operation, the second breaker would also need to be opened/disconnected. However, if the DC or quasi-DC current flowing through the second breaker is sufficiently large, on the order of 50 or more amperes, this second breaker will most likely not open and hence the local power grid cannot be protected by shutting it down. Or if the breaker did attempt to open without a zero crossing, the current would not be extinguished, that is an arc could form between the breaker contacts, and therefore it would be impossible to shut down this local power grid.

A further example of such mis-operation relates to the use of relays to control breakers on the high voltage power lines (buses) of a primary ring bus as shown in FIG. 10. In this example circuit 1000, five (5) buses are connected to two (2) utilities 1002*a*, 1002*b*, which can be operated by five (5) breakers 1006*a-e* which connect the buses. If DC or quasi-DC currents are induced in the transmission lines (buses) and therefore in the transformers 1006*a-c*, the DC offset on the phases of the AC power waveform can cause the relays to mis-operate which in turn can prevent the high voltage breakers from opening when potentially damaging conditions, such as half-cycle transformer saturation and demand for large reactive power (VARs), is experienced. By employing direct current (DC) neutral blocking systems on HV and EHV power transformers in a grid, the chance for mis-operation of relays, breakers and other critical equipment can be greatly reduced or eliminated.

In addition to the circuits of FIGS. 9-10, it is noted that the triggering of transformer neutral blocking at particular thresholds may have additional advantageous effects on electrical equipment beyond circuit breakers. For example, the detection of either quasi-DC currents in transformers or the detection of induced power line harmonics to allow the automatic operation of a transformer neutral blocking system such that unacceptable noise and vibration in transformers, static VAR compensators and other power equipment can be greatly reduced or eliminated. The saturation of power transformers by DC or quasi-DC currents can result in huge increases in reactive power losses in power transformers and can result in large Lorentz forces between transformer windings which give rise to vibrating windings which can emit significant audible growling noise from transformers. This noisy transformer condition during geomagnetic disturbances (GMDs) can often occur for DC currents which are larger than only 0.5 amperes.

Referring to FIGS. 1-10 generally, it is noted that the triggering of the neutral ground blocking devices would need to be achieved as rapidly as is possible, on the order of 100 milli-seconds, after the increased quasi-DC current, e.g., 5 Amps, is detected in order to provide the DC blocking and avoiding the loss of the current zero crossings and also the loss of the ability to rapidly open the HV power line breakers to protect the HV power line transformers and associated equipment. It is recognized that an EMP E3 pulse can induce currents in transmission lines up to 2,250 Amps per phase which is 6,750 Amps of neutral current in a three (3) phase system. Additionally, the pulse width of an EMP E3 Blast Wave induced current event can be on the order of 500 to 1,000 milliseconds. This can result in a long period in which there are no current zero crossings which will thereby cause the mis-operation of power line breakers. Therefore, also in the case of an EMP E3 event, such a higher level field of shorter duration (as compared to a 100 year GMD storm) will require automated systems to provide protection of the primary components of a modern power system.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of ensuring operation of one or more circuit breakers electrically connected on a phase of a multi-phase power line on a transformer electrically connected within a power grid at a substation, the method comprising:
    detecting, at the transformer, a direct current component of a multi-phase power signal received at the transformer, the direct current component comprising a direct current received at a transformer neutral, the transformer neutral being electrically connected to a ground;
    determining whether the direct current is above a predetermined threshold, the predetermined threshold being based on a determination that, above the predetermined threshold, at least one of the one or more circuit breakers electrically connected to at least one phase of the transformer is incapable of reliable operation;
    in response to a determination that the direct current component is above the predetermined threshold, blocking the direct current with a direct current neutral blocking circuit between the transformer neutral and a ground.

2. The method of claim 1, further comprising:
    detecting, at the transformer, harmonic signals via a harmonic sensor on a phase of the transformer;
    determining whether the harmonic signals are above a predetermined harmonics threshold, beyond which at least one of the one or more circuit breakers electrically connected to at least one phase of the transformer is incapable of reliable operation;
    in response to a determination that the harmonic signals are above the predetermined harmonic threshold, introducing the direct current neutral blocking circuit between the transformer neutral and the ground.

3. The method of claim 1, further comprising, after blocking the direct current between the transformer neutral and the ground, opening the circuit breaker to disconnect the phase.

4. The method of claim 1, wherein a plurality of circuit breakers are electrically connected to corresponding phases of a multi-phase power line, and wherein the method further includes, after blocking the direct current with a direct current neutral blocking circuit between the transformer neutral and the ground, opening each of the plurality of circuit breakers.

5. The method of claim 1, wherein the potential damaging and/or trouble-some direct current predetermined threshold is defined, at least in part, by circuit breaker manufacturer specifications.

6. The method of claim 1, wherein blocking the direct current with the direct current neutral blocking circuit between the transformer neutral and ground protects against damage to the at least one of the one or more circuit breakers.

7. The method of claim 1, wherein the predetermined threshold is selected such that, above the predetermined threshold, at least one of the one or more circuit breakers is exposed to a current that remains non-zero over at least one alternating current period.

8. An electrical protection system comprising:
    a transformer included in a transformer assembly having a plurality of connections, each connection associated with a different power line phase of an alternating current power signal;
    a direct current sensor to transmit a signal upon detection of a direct current in the neutral of the transformer;
    at least one breaker electrically connected to a power line phase of the transformer;
    a direct current neutral blocking circuit electrically connected between the transformer neutral and a ground;
    a processor to receive the signal from the direct current sensor, the processor electrically connected to the at least one breaker and configured to open the at least one breaker electrically connected to the power line phase of the transformer upon receiving the signal from the direct current sensor in response to a determination at the processor that the direct current in the neutral is above a predetermined threshold,
    wherein, above the predetermined threshold, at least one of the one or more circuit breakers electrically connected to at least one phase of the transformer is incapable of reliable operation.

9. The electrical protection system of claim 8, wherein the processor is electrically connected to the direct current neutral blocking circuit and configured to actuate the direct current neutral blocking circuit upon receiving the signal from the direct current sensor.

10. The electrical protection system of claim 8, further comprising:
    a harmonic signal sensor to transmit a signal upon detection of a harmonic signal at the at least one phase of the transformer;
    a processor to receive the signal from the harmonic signal sensor, the processor electrically connected to the at least one breaker and configured to open the at least one breaker electrically connected to a power line phase of the transformer upon receiving the signal from the harmonic signal sensor.

11. The electrical protection system of claim 10, wherein the processor is electrically connected to the direct current neutral blocking circuit and configured to actuate the direct current neutral blocking circuit upon receiving the signal from the harmonic signal sensor.

12. The electrical protection system of claim 8, wherein the transformer comprises a multi-phase transformer.

13. An electrical protection system comprising:
    a transformer having a transformer neutral and a connection to a power line phase, the power line including a plurality of power line phases;
    a direct current sensor electrically connected at a transformer neutral;
    at least one breaker electrically connected to a power line phase of the transformer;
    a direct current neutral blocking circuit electrically connected between the transformer neutral and a ground;
    a processor electrically connected to the direct current sensor and electrically connected to the at least one breaker, the processor configured to open the at least one breaker electrically connected to the power line phase of the transformer in response to a determination that the direct current in the neutral is above a predetermined threshold, wherein, above the predetermined threshold, at least one of the one or more circuit breakers electrically connected to the phase of the transformer is incapable of reliable operation.

14. The electrical protection system of claim 13, further comprising a harmonic sensor on a phase of the transformer.

15. The electrical protection system of claim 14, wherein the processor is further configured to determine whether the harmonic signals are above a predetermined harmonics threshold, beyond which the at least one circuit breaker is incapable of reliable operation.

16. The electrical protection system of claim 15, wherein the processor is further configured to, in response to a determination that the harmonic signals are above the predetermined harmonic threshold, introduce the direct current neutral blocking circuit between the transformer neutral and the ground.

17. The electrical protection system of claim 13, wherein the predetermined threshold is selected such that, above the predetermined threshold, the at least one circuit breaker is exposed to a current that remains non-zero over at least one alternating current cycle time.

\* \* \* \* \*